US012760935B2

(12) United States Patent
Ho et al.

(10) Patent No.: US 12,760,935 B2
(45) Date of Patent: Oct. 13, 2026

(54) FALLING PARTICLE RECEIVER SYSTEMS WITH MASS FLOW CONTROL

(71) Applicant: National Technology & Engineering Solutions of Sandia, LLC, Albuquerque, NM (US)

(72) Inventors: Clifford K. Ho, Albuquerque, NM (US); Kevin Albrecht, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 18/117,932

(22) Filed: Mar. 6, 2023

(65) Prior Publication Data

US 2023/0221040 A1 Jul. 13, 2023

Related U.S. Application Data

(63) Continuation of application No. 17/047,335, filed as application No. PCT/US2019/030330 on May 2, 2019, now Pat. No. 11,609,026.

(60) Provisional application No. 62/666,538, filed on May 3, 2018.

(51) Int. Cl.

| | |
|---|---|
| ***F24S 20/20*** | (2018.01) |
| ***F03G 6/00*** | (2006.01) |
| ***F24S 50/40*** | (2018.01) |
| ***F24S 80/00*** | (2018.01) |
| ***F24S 80/20*** | (2018.01) |

(52) U.S. Cl.
CPC .............. *F24S 20/20* (2018.05); *F03G 6/108* (2021.08); *F03G 6/121* (2021.08); *F24S 50/40* (2018.05); *F24S 80/00* (2018.05); *F24S 80/20* (2018.05); *Y02E 10/40* (2013.01)

(58) Field of Classification Search
CPC ......... F03G 6/00–129; F03G 6/06–129; F28D 17/005; F28D 19/02; F28D 2021/0045; F24S 80/20; F24S 70/10; F24S 50/40; F24S 2080/03; F24S 2080/05; F24S 20/20; F24S 80/00; F24S 60/00; Y02E 10/40; Y02E 10/44
See application file for complete search history.

(56) References Cited

U.S. PATENT DOCUMENTS

| | | | | |
|---|---|---|---|---|
| 4,158,385 | A * | 6/1979 | Vandenhoeck | F28D 19/02 165/300 |
| 8,109,265 | B1 | 2/2012 | Kolb | |
| 2008/0176289 | A1 | 7/2008 | Zeng et al. | |
| 2011/0126824 | A1* | 6/2011 | Conlon | F22B 35/16 126/569 |
| 2011/0203573 | A1 | 8/2011 | Hollis et al. | |
| 2013/0068217 | A1 | 3/2013 | Al-Ansary et al. | |
| 2013/0112280 | A1 | 5/2013 | Quam et al. | |
| 2013/0257056 | A1* | 10/2013 | Ma | F28D 20/0056 126/714 |
| 2014/0311479 | A1* | 10/2014 | Maryamchik | F03G 6/067 126/714 |
| 2015/0316328 | A1 | 11/2015 | Trainham et al. | |

(Continued)

*Primary Examiner* — Ko-Wei Lin
(74) *Attorney, Agent, or Firm* — Daniel J. Jenkins

(57) ABSTRACT

The present disclosure is directed to systems and methods to control particle mass flow rate in solar receivers and associated heat exchangers based on feedback from one or more temperatures of particles in the system.

18 Claims, 4 Drawing Sheets

(56) References Cited

U.S. PATENT DOCUMENTS

| | | | | |
|---|---|---|---|---|
| 2016/0017869 | A1* | 1/2016 | Sakadjian | F02C 1/10<br>126/714 |
| 2016/0032786 | A1 | 2/2016 | Zampieri | |
| 2018/0179960 | A1* | 6/2018 | Apte | H02P 9/04 |

* cited by examiner

FALLING PARTICLE RECEIVER SYSTEMS WITH MASS FLOW CONTROL

CROSS-REFERENCE TO RELATED APPLICATIONS

This application is a continuation of U.S. patent application Ser. No. 17/047,335, filed Oct. 13, 2020, which is a U.S. National Stage Filing under 35 U.S.C. § 371 of International Patent Application Serial No. PCT/US2019/030330, filed May 2, 2019, which claims priority to U.S. Provisional Patent Application Ser. No. 62/666,538, filed on May 3, 2018, and entitled, "Falling Particle Receiver Systems with Mass Flow Control," the disclosure of which is incorporated by reference herein in its entirety.

This application is related to U.S. Provisional Patent Application Ser. No. 62/145,136, "Falling Particle Solar Receivers," filed on Apr. 9, 2015, and to U.S. patent application Ser. No. 15/095,738, "Falling Particle Solar Receivers," filed on Apr. 11, 2016, the disclosures of which are incorporated by reference herein in their entireties.

STATEMENT CONCERNING FEDERALLY SPONSORED RESEARCH

The United States Government has rights in this invention pursuant to Contract No. DE-AC04-94AL85000 between the United States Department of Energy and Sandia Corporation, and pursuant to Contract No. DE-NA0003525 between the United States Department of Energy and National Technology & Engineering Solutions of Sandia, LLC, for the operation of the Sandia National Laboratories.

FIELD OF THE INVENTION

The present disclosure is generally directed to solar energy, and more particularly directed to falling particle concentrated solar receivers with mass flow control.

BACKGROUND OF THE INVENTION

Solar power systems offer much promise for clean energy, with few, or zero, carbon emissions. These systems collect incident sunlight and convert this sunlight into a usable form of power, such as heat or electricity. Solar energy offers a clean, inexhaustible, sustainable solution to energy demands and has the potential to supply a very significant fraction of U.S. and global electricity consumption. While the U.S. and global solar power potential is known to be immense, solar power systems have not been economically competitive without government support, to date. Challenges remain to devise solar technologies that can lower installation costs, increase power output, and lower the marginal cost per unit energy produced, for a lower levelized cost of energy.

Emerging solar power systems include particle solar receivers that heat particles for energy conversion, energy storage, thermochemical processes, electricity production, and process heating. However, previously disclosed processes and systems are either not efficient in capturing solar energy to heat particles or require complex structures or fluidization, which increase both costs and parasitic electricity consumption.

Falling particle receivers are the next-generation concentrating solar power systems and include a next-generation 10 MWe solarized supercritical $CO_2$ ($sCO_2$) Brayton cycle. One of the options for providing the heat to the $sCO_2$ power cycle is the use of a falling particle receiver system.

In order to scale-up the falling particle receiver technology from 1 MW-thermal prototypes to larger systems (e.g., 10 MWe), systems and methods need to be implemented to control the mass flow of particles through the solar receiver to achieve the desired outlet temperature, even when the solar irradiance is changing. Also, the flow of particles through a solar particle heat exchanger, such as a particle/$sCO_2$ heat exchanger, can also be controlled to achieve the desired heat transfer to the $sCO_2$ at a prescribed thermal duty.

In order to effectively and efficiently operate falling particle receivers, systems and methods are needed to control the mass flow of particles through the solar receiver and associated heat exchanger to achieve the desired particle and working-fluid outlet temperatures.

SUMMARY OF THE INVENTION

The disclosure is directed to systems and methods to control particle mass flow rate in solar receiver systems based on feedback from the particle outlet temperature. In an embodiment, the flow control device controls mass flow rate of particles entering a solar receiver and a corresponding heat exchanger associated with the solar receiver. In various embodiments, the systems and methods include a particle feed system, slide gate or other flow control device that varies mass flow rates of particles through the solar receiver and heat exchanger based on feedback from particle outlet temperature and desired working fluid temperature.

An embodiment of the disclosure includes a solar receiver system with a solar receiver having an inlet and an outlet and one or more particle flow devices at the inlet of the solar receiver to control the temperature of particles flowing through the solar receiver. This embodiment can include a hopper connected to the particle flow devices. The hopper discharges the particles. The particle flow devices include a flow control member that can have a slide gate device. The solar receiver system can also include a storage bin with an inlet and an outlet. The storage bin is connected to the solar receiver. A heat exchange can be connected to the storage bin and also include a particle flow control device at the inlet of the heat exchanger. The particle flow devices can include a particle temperature measuring device that has one or more troughs.

Another embodiment of the present invention includes a solar receiver system with a heat exchanger configured to exchange heat from heated particles to a second medium. One or more flow control devices are disposed at the inlet of the heat exchanger to control the particle flow and temperature. The second medium may be a working fluid (e.g., supercritical $CO_2$) for a power cycle.

Yet another embodiment of the present invention includes a solar receiver system that includes a solar receiver having an outlet, two or more storage bins for collecting and storing particles from the outlet, and one or more particle flow control devices disposed at locations within the system to control the particle flow and temperatures. The particle flow control devices are controlled automatically by the measured particle temperature exiting the receiver. Two or more particle flow control devices can be programmed to accommodate a non-uniform irradiance on the particle curtain such that the mass flow of particles is greatest where the irradiance is highest, and vice-versa. The particle flow control devices can be controlled automatically by the measured particle temperature entering the heat exchanger. The particle flow control devices can be controlled automatically by the working fluid temperature exiting the heat exchanger.

Proportional-integral-derivative control methods can be used to control the particle flow control devices to achieve a steady particle outlet temperature. Proportional-integral-derivative control methods can be used to control the particle flow control devices to achieve a steady working-fluid outlet temperature.

An embodiment of the present invention includes a method of controlling flow of particles. The method includes heating particles in a solar receiver in a solar receiver system, measuring temperatures of the particles and secondary medium at one or more locations within the system, and adjusting the flow of particles at least through one component of the system based on the measured temperatures.

In an embodiment, a solar receiver system includes a solar receiver having an inlet and an outlet and one or more particle flow control devices disposed at the inlet or outlet to control the particle heating and outlet temperature.

In another embodiment, a solar receiver system includes a solar receiver having an outlet, two or more storage bins for collecting and storing particles from the outlet, and one or more particle flow control devices disposed at locations within the system to control the particle flow and temperatures.

In another embodiment, a method is disclosed that includes heating particles in a solar receiver in a solar receiver system, measuring temperatures of the particles and secondary medium at one or more locations within the system, and adjusting the flow of particles at least through one component of the system based on the measured temperatures.

An advantage of the disclosed systems and methods is the ability to control the particle outlet temperature automatically by adjusting the particle mass flow rate through the receiver using a closed-loop control system.

Another advantage is the ability to automatically control the working-fluid temperature (e.g., for a power cycle) exiting the particle-to-working-fluid heat exchanger by controlling the mass flow rate of the particles and/or working-fluid flowing through the heat exchanger.

Another advantage is the ability to use proportional-integral-derivative (PID) control methods to achieve the desired particle and/or working-fluid temperatures in a smooth and accelerated fashion to avoid temperature oscillations ("ringing") for prolonged periods.

Another advantage is the ability to increase the number of flow control devices across the width of a particle inlet to accommodate larger capacity solar receiver systems (e.g., up to about 100 MW). Having multiple particle flow control devices also allows more efficient heating of the particles by enabling more particle flow where the irradiance is highest (typically in the middle) and less flow where the irradiance is lower (towards the outside).

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The figures depict embodiments of the present invention for purposes of illustration only, and are not necessarily drawn to scale. One skilled in the art will readily recognize from the following discussion that alternative embodiments of the structures and methods illustrated herein may be employed without departing from the principles of the invention described herein.

DETAILED DESCRIPTION OF THE INVENTION

The present disclosure is directed to systems and methods to control the particle mass flow rate in a solar receiver and heat exchanger based on feedback from particle and/or working-fluid outlet temperatures.

Figure 1:
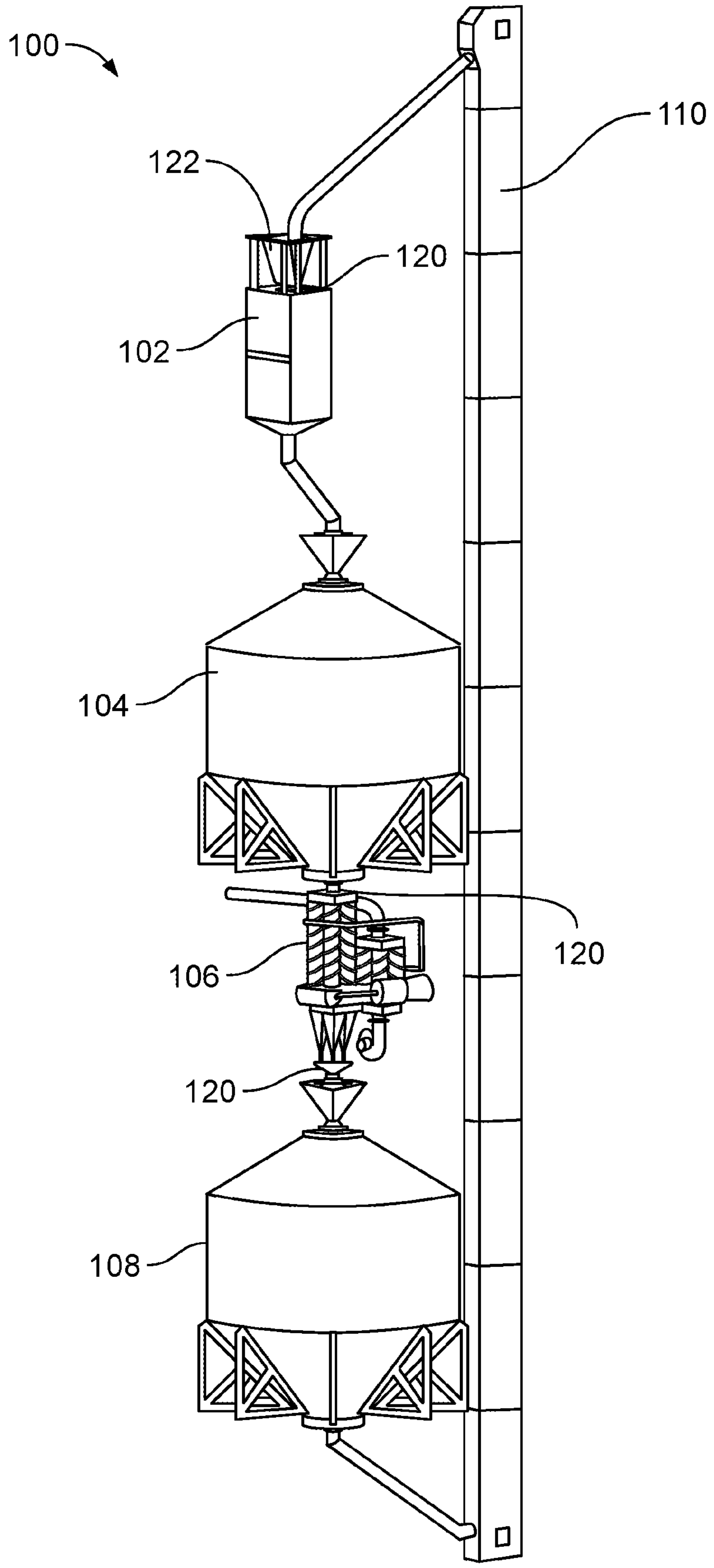
FIG. 1 illustrates a falling particle solar receiver system according to an embodiment of the disclosure.

FIG. 1 illustrates a falling particle solar receiver system 100 according to an embodiment of the disclosure. As can be seen in FIG. 1, the system 100 includes a falling particle solar receiver (receiver) 102, a high temperature storage bin 104, a heat exchanger 106, a low temperature storage bin 108, and a particle return system 110. In this exemplary embodiment, the receiver 102 is a multi-aperture falling particle receiver, however, in other embodiments, other solar receiver designs may be used.

Also, in this exemplary embodiment, the heat exchanger 106 transfers heat from the particles to supercritical $CO_2$ for a Brayton power cycle. However, in other embodiments, other heat transfer materials may be used, such as, but not limited to air, water/steam, molten salt, and thermal oils. Also in this exemplary embodiment, the particle return system 110 is a bucket elevator; however, in other embodiments, other material conveyance devices may be used, such as, but not limited to skip hoists, screw elevators, and pneumatic lifts.

The system 100 further includes a particle mass flow control device 120 (see FIGS. 2 and 3) between a hopper 122 and the receiver 102. The hopper 122, which receives cool particles from the particle return system 110, provides a buffer volume of particles for the receiver 102. The hopper 122 includes a discharge opening or outlet (not shown) at the bottom of the hopper 122.

The particle flow control device (flow control device) 120 controls the amount of particles discharged from the hopper 122 to the receiver 102. The flow control device 120 can include a flow control member 121. In this exemplary embodiment, the flow control device 120 includes one flow control member 121. However, in other embodiments, the flow control device 120 may include one or more flow control members. The receiver 102 includes a corresponding inlet (not shown) to the outlet of the hopper 122. It should be appreciated that the system 100 includes control device operation components (not shown) for moving the flow control member 121 (see FIG. 2) across and between the outlet of the hopper 122 and the inlet of the receiver 102. In such a manner, the flow control device 120 regulates the amount of particles flowing from the hopper 122 to the receiver 102 from between full flow and zero flow, and thus, controls the amount of particles falling through the receiver 102.

Figure 2:
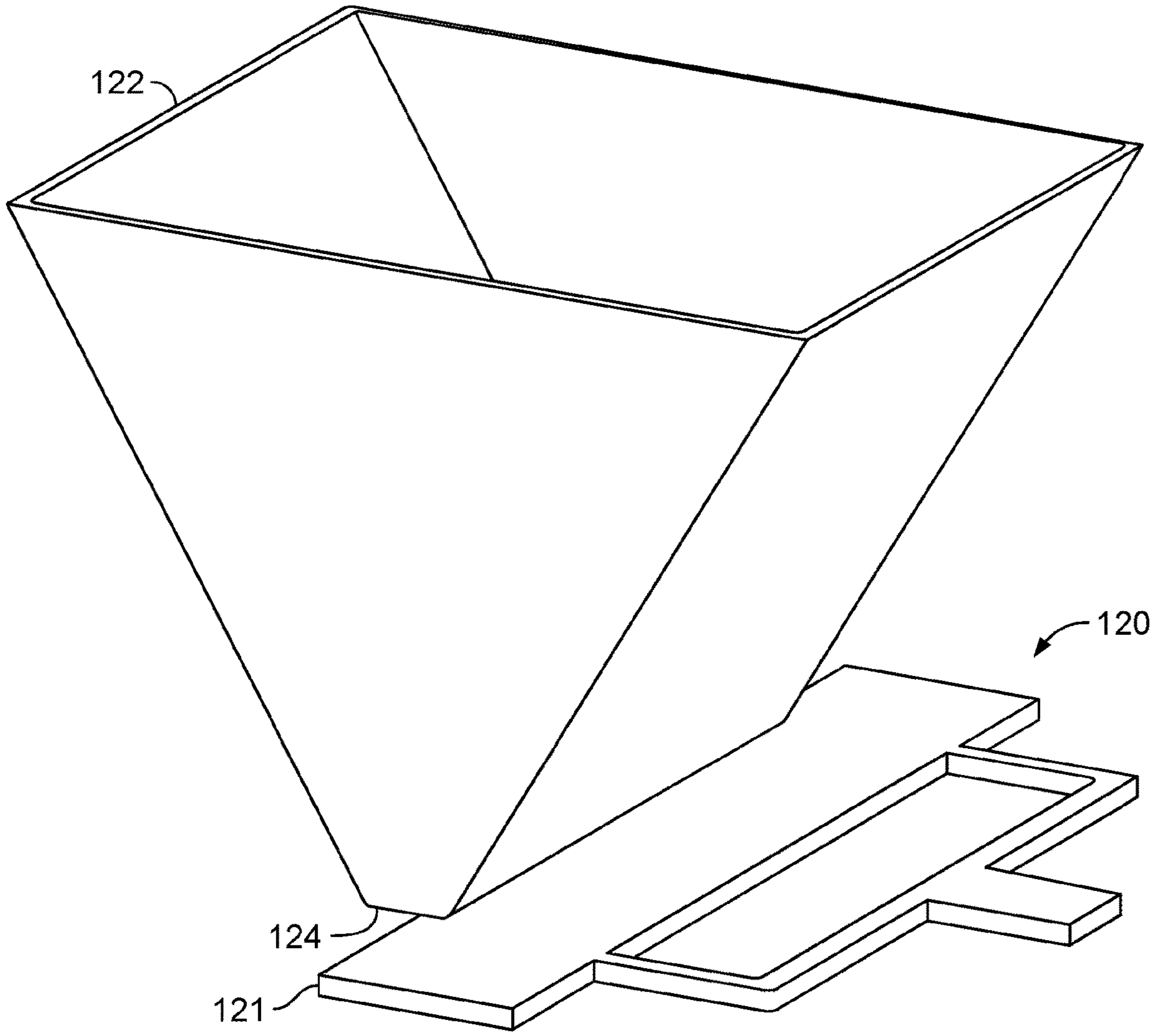
FIG. 2 shows a flow control device and hopper according to an embodiment of the disclosure.

Referring to FIG. 2, it can be seen how moving the flow control member 121 to the left across the width of the hopper discharge opening 124 effectively narrows the stream of discharged particles thereby creating a thinner particle curtain stream to the receiver 102. Similarly, as the flow control member 121 is disposed between the discharge opening 124 and the inlet to the receiver 102, the movement of the flow control member 121 can be understood as narrowing the receiver inlet. As such, the falling particle curtain, being irradiated on one-side, a thinner curtain results in less shading and more irradiance of particles toward the rear of the falling particle curtain through the receiver 102, resulting in higher average/bulk particle temperatures. If the flow control member 121 moves to the right, the hopper discharge opening 124 is effectively enlarged, and more particles will flow into the receiver 102. The higher particle mass flow rates result in lower average/bulk particle outlet temperatures.

In this exemplary embodiment, the flow control device 120 is a slide gate device. However, in other embodiments, the flow control device 120 may be a slide gate, hinged gate, rotary valve, ball valve, or other particle flow control device that can regulate the amount of particle flow through the device.

Also in this exemplary embodiment, the flow control member 121 is a solid member. However, in other embodiments, the flow control member 121 may include holes, slots or other openings to create a pattern release of particles from the flow control device. In an embodiment, a flow control device may include other flow control members that may partially or completely cover one or more of the openings in the hopper 122.

In an embodiment, the flow control member 121 can include a pattern such that when particles are released from the hopper 122 through the flow control member 121, the particles form a pre-determined pattern. A release pattern can be used so that the mass flow rate would not change the particle temperature at the receiver outlet. For example, a perforated plate with a single row of holes through which particles can fall through can be the gate, where the row of holes is perpendicular to the incoming rays of the particle receiver. In another embodiment, a slide gate may be used with slots that allow only every other hole to flow particles. This arrangement can be used to increase mass flow rate without changing temperature. In another embodiment, a slide gate may be pulled back further to allow all the holes to flow particles. In this embodiment, mass flow of twice as many particles may be achieved, but, unlike a continuous particle curtain, all of the particle streams through the holes still see the same amount of irradiance (no increased shading). Thus, the heating and particle temperatures will be the same in both modes of operation, despite the mass flow being increased by opening up twice as many holes.

The flow control device 120 is preferably sufficiently far enough from the receiver 102 so as not to overheat and cause sticking problems. The flow control device 120 can be actuated in a closed-loop feedback system to maintain the outlet temperature of the particles within a desired range. For example, if the particles are too cold, the flow control device 120 will close to reduce the particle flow, which increases the particle temperatures. If the particles are too hot, the flow control device 120 opens to increase the particle flow, which reduces the particle outlet temperatures. A control system for both the particle receiver 102 and heat exchanger 106 can be used to achieve desired particle and working fluid (e.g., supercritical $CO_2$) outlet temperatures using PID methods by controlling the mass flow rate of particles and/or working fluid.

Figure 3:
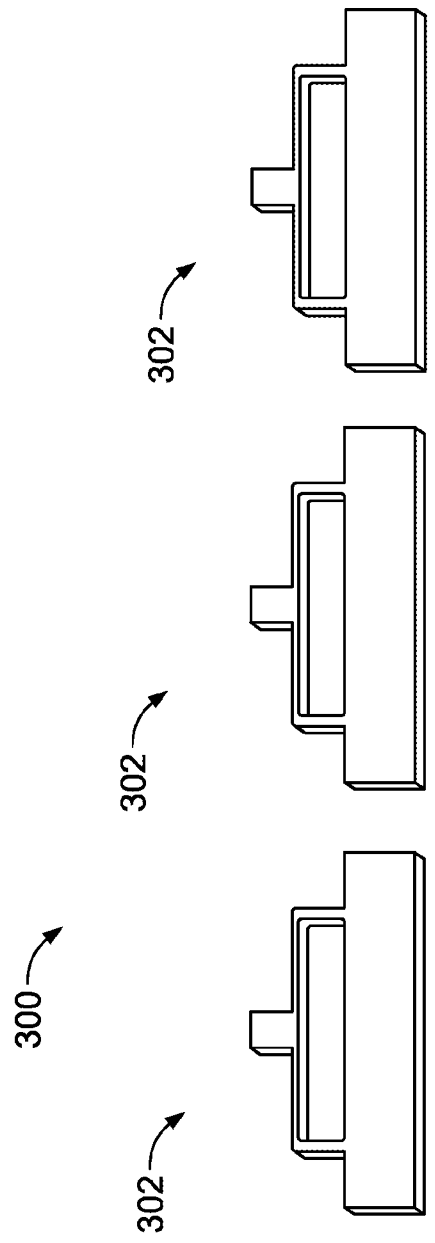
FIG. 3 illustrates a multiple flow control arrangement according to an embodiment of the disclosure.

FIG. 3 shows a flow control arrangement 300 that includes three flow control devices 302 that control the flow of particles into three particle inlets of a receiver (not shown). In this exemplary embodiment, the flow control arrangement 300 includes three flow control devices 302. However, in other embodiments, the flow control arrangement 300 may include two or more flow control devices. Also, in this exemplary embodiment, the flow control devices are slide gates. However, in other embodiments, the flow control devices may be other embodiments as described above. Also, in this exemplary embodiment, receiver includes three particle inlets 304. However, in other embodiments, the receiver may include a single continuous inlet or a number of inlets corresponding to the number of flow control devices. FIG. 3 illustrates how this flow control arrangement can be scaled up to accommodate any size or capacity of the solar receiver system by simply increasing the number of slide gates or flow control systems.

Referring again to FIGS. 1 and 2, in another embodiment, particle mass flow may also be controlled by controlling the speed at which the particle return system 110 transports particles to the hopper 122. In this exemplary embodiment, the particle return system 110 is a bucket elevator, but a more continuous screw-type particle elevator can be used where the speed of the rotating casing controls the mass flow rate of the lifted particles. The particles are then distributed along a desired discharge slot before entering the receiver. The flow rate of the elevator can be actuated in a closed-loop feedback system to maintain the outlet temperature of the particles within a desired range.

The present disclosure is further directed to using a flow control device at the bottom and/or top of the heat exchanger to control the mass flow of particles through the heat exchanger. In this exemplary embodiment, a flow control device 120 is shown proximate to the outlet of the heat exchanger 106 to control the mass flow of the moving packed-bed of particles. In other embodiments, other heat exchanger designs such as fluidized-bed heat exchangers can be used in which the flow control device 120 is proximate to the inlet of the heat exchanger 106 to control the mass flow of particles. The flow control device 120 is used to ensure the appropriate amount of heat transfer to the working fluid (e.g., $sCO_2$) and to reduce thermal shock to the system. In an embodiment, cold particles may be blended with the hot particles in the heat exchanger from a separate reservoir to minimize thermal shock during start-up.

The present disclosure is further directed to a method of operating a falling particle solar receiver system that includes measuring the temperature of the particles at one or more locations in the system including, but not limited to, the inlet of the feed hopper 122, the outlet of the feed hopper 122, the outlet of the receiver 102, at the high temperature storage bin 104, at the inlet to the heat exchanger 106, at the outlet of the heat exchanger 106, and at the low temperature storage bin 108. In such a manner, the heat transfer from the particles to another medium in the heat exchanger 106 can be maximized for the application.

Figure 4:
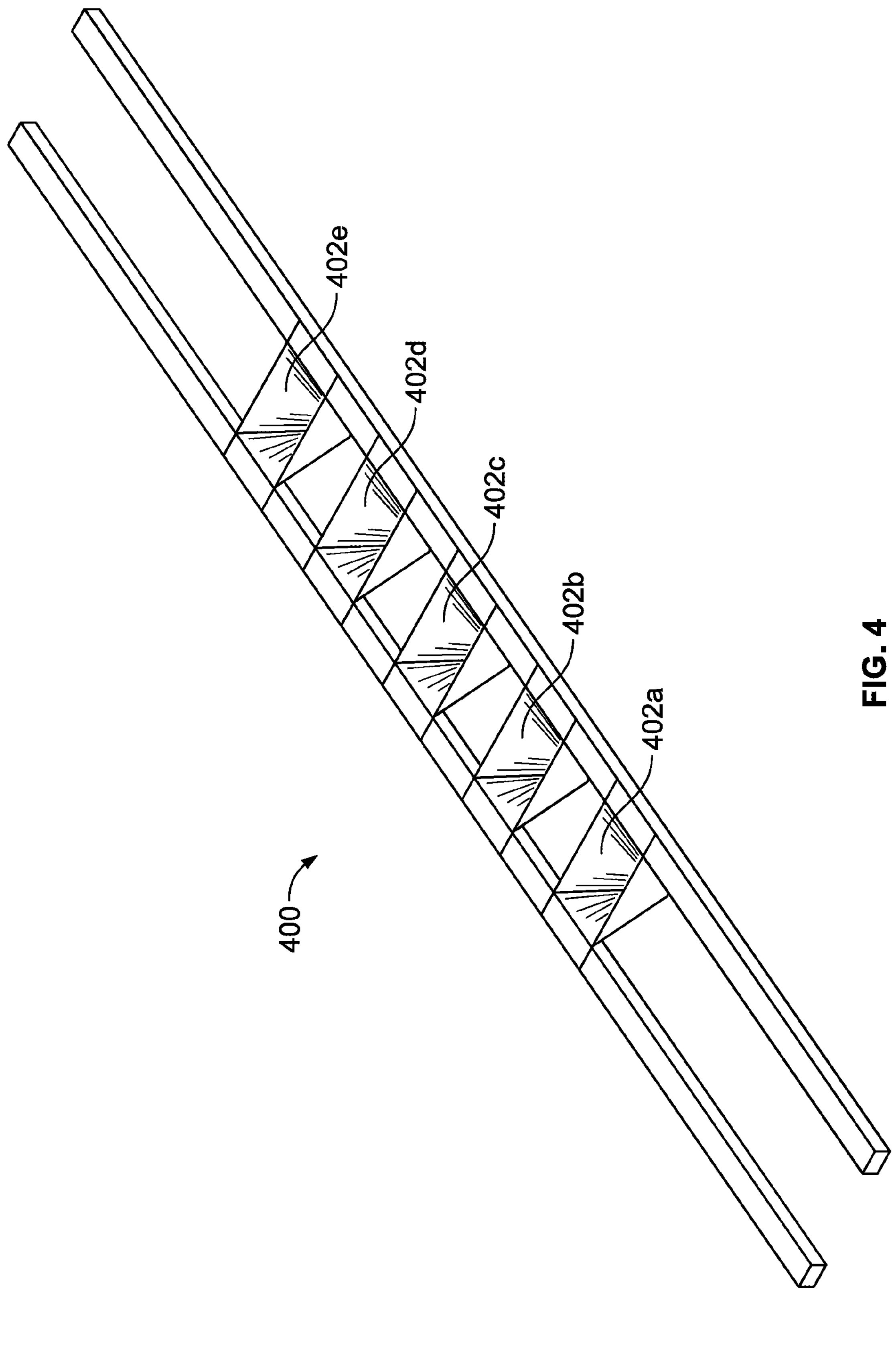
FIG. 4 illustrates a collection system to accurately measure the particle temperature exiting the receiver by immersing a thermocouple (not shown) in particles flowing through a funnel-shaped device.

Referring to FIG. 4, the present disclosure is further directed to a particle temperature measuring device 400 that includes one or more mini troughs (funnels) **402*a*-402*e* that collect the particles along the bottom of the receiver 102 so that the particles accumulate in the troughs 402*a*-402*e* (slightly) before passing by a thermocouple that is immersed in the particles near the bottom of each trough 402*a*-402*e***.

This particle temperature measuring device 400 allows for accurate measurement of the temperature of free-falling particles in situ. By having a series of the troughs **402*a*-402*e***, the temperature distribution of the particles falling along the length of the particle curtain stream can be measured. This can independently control each slide gate for particle release along the entire length of the potentially long curtain. Because the irradiance may be non-uniform, there is an advantage and increased efficiency to allow more flow where the irradiance is highest (typically in the middle) and less flow where the irradiance is lower (towards the outside).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solar receiver system, comprising:
- a solar receiver having an inlet and an outlet;
- a hopper that provides particles to the solar receiver inlet;
- a first storage bin that receives the particles from the solar receiver outlet;
- a heat exchanger that receives particles from the first storage bin;
- a first particle flow control device disposed at the inlet of the solar receiver to control the flow of the particles from the hopper to the solar receiver to achieve a desired temperature of the particles discharged from the solar receiver; and
- a second particle flow control device disposed between the first storage bin and the heat exchanger;
- wherein the first particle flow control device is capable of receiving an input to change the flow of particles to the solar receiver based on a first temperature measurement of the particles released from the solar receiver;
- wherein the first particle flow control device is also capable of receiving an input to change the flow of particles to the solar receiver based on a second temperature measurement of particles in the first storage bin; and
- wherein the first particle flow control device thereby controls particle temperature of particles in the first storage bin and particle temperature of particles flowing into the heat exchanger.

2. The solar receiver system of claim 1 wherein the particle flow control devices comprise a flow control member.

3. The solar receiver system of claim 2, wherein the flow control member comprises a slide gate device.

4. The solar receiver system of claim 1 wherein the storage bin comprises an inlet connected to the outlet of the solar receiver.

5. The solar receiver system of claim 4 wherein the heat exchanger comprises an outlet connected to the storage bin.

6. The solar receiver system of claim 1, wherein the first particle flow control device comprises a temperature measurement device.

7. The solar receiver system of claim 1 wherein the second particle flow control device comprises a temperature measurement device.

8. The solar receiver system of claim 6 wherein the temperature measurement device comprises one or more troughs.

9. A solar receiver system, comprising:
- a solar receiver for heating particles;
- a heat exchanger comprising an inlet and an outlet, the heat exchanger configured to exchange heat from the heated particles to a second medium;
- a particle storage bin disposed between the solar receiver and the heat exchanger; and
- a flow control device to control the particle flow of particles into the solar receiver based on an input from a temperature measurement device measuring particle temperature at the first storage bin.

10. The system of claim 9, wherein the second medium is a working fluid for a power cycle.

11. The system of claim 10, wherein the working fluid is supercritical $CO_2$.

12. A solar receiver system, comprising:
- a solar receiver having an outlet;
- a storage bin for collecting and storing particles from the outlet; and
- one or more particle flow control devices disposed at locations within the system to control the particle flow within the solar receiver system;
  - wherein the particle flow and particle temperature of the particles flowing into the storage bin is determined by controlling the width of the flow into the solar receiver based on a particle temperature measurement made by a temperature measurement device at the storage bin; and
  - wherein the one or more particle flow control devices thereby control particle temperature of the particles in the storage bin.

13. The system of claim 12, wherein the one or more particle flow control devices are controlled automatically based on a measured particle temperature exiting the receiver.

14. The system of claim 12, wherein the one or more particle flow control devices is two or more particle flow control devices that are programmed to accommodate a non-uniform irradiance on particle curtain such that the mass flow of particles is greatest where the irradiance is highest, and vice-versa.

15. The system of claim 12, wherein the one or more particle flow control devices is two or more particle flow control devices that are controlled automatically based on a measured particle temperature entering the heat exchanger and the heat exchanger is disposed between the solar receiver and the storage bin.

16. The system of claim 12, wherein the one or more particle flow control devices are controlled automatically based on a working fluid temperature exiting the heat exchanger and the heat exchanger is disposed between the solar receiver and the storage bin.

17. The system of claim 12, wherein proportional-integral-derivative control methods are used to control the one or more particle control devices to achieve a steady particle outlet temperature.

18. The system of claim 17, wherein proportional-integral-derivative control methods are used to control the one or more particle flow control devices to achieve a steady working-fluid outlet temperature.

* * * * *